US010718360B2

(12) United States Patent
Odaka

(10) Patent No.: US 10,718,360 B2
(45) Date of Patent: Jul. 21, 2020

(54) HYDRAULIC FLUID DEVICE

(71) Applicant: SMC CORPORATION, Chiyoda-ku (JP)

(72) Inventor: Tsukasa Odaka, Tsukubamirai (JP)

(73) Assignee: SMC CORPORATION, Chiyoda-ku (JP)

(*) Notice: Subject to any disclaimer, the term of this patent is extended or adjusted under 35 U.S.C. 154(b) by 0 days.

(21) Appl. No.: 16/324,432

(22) PCT Filed: Jun. 27, 2017

(86) PCT No.: PCT/JP2017/023526
§ 371 (c)(1),
(2) Date: Feb. 8, 2019

(87) PCT Pub. No.: WO2018/030013
PCT Pub. Date: Feb. 15, 2018

(65) Prior Publication Data
US 2019/0170167 A1 Jun. 6, 2019

(30) Foreign Application Priority Data
Aug. 10, 2016 (JP) ................... 2016-157611

(51) Int. Cl.
*F15B 15/14* (2006.01)
*F15B 15/28* (2006.01)
*F15B 13/04* (2006.01)

(52) U.S. Cl.
CPC .......... *F15B 15/14* (2013.01); *F15B 13/0402* (2013.01); *F15B 15/28* (2013.01);
(Continued)

(58) Field of Classification Search
CPC ...... F15B 15/14; F15B 15/28; F15B 15/2861; F15B 15/2892
See application file for complete search history.

(56) References Cited

U.S. PATENT DOCUMENTS 3,391,614 A 7/1968 Kampert et al.
3,867,301 A 6/1975 Henkel
(Continued)

FOREIGN PATENT DOCUMENTS

CN 2793449 Y 7/2006
CN 101218436 A 7/2008
(Continued)

OTHER PUBLICATIONS

Combined Chinese Office Action and Search Report dated Nov. 1, 2019, in Patent Application No. 201780048873.1 (with English translation), 16 pages.
(Continued)

*Primary Examiner* — Thomas E Lazo
(74) *Attorney, Agent, or Firm* — Oblon, McClelland, Maier & Neustadt, L.L.P.

(57) ABSTRACT

A hydraulic fluid cylinder is equipped with a cylinder tube, a piston unit, and a piston rod. The piston unit has a piston body provided with a gasket-mounting groove. A gasket member is mounted in the gasket mounting groove. The gasket member has a gasket body provided with a magnet-mounting groove exhibiting groove depth in the axial direction of the piston unit, and also has a magnet mounted in the magnet-mounting groove.

13 Claims, 8 Drawing Sheets

(52) U.S. Cl.
CPC ...... *F15B 15/2861* (2013.01); *F15B 15/2892* (2013.01); *F15B 2013/0409* (2013.01)

(56) References Cited

U.S. PATENT DOCUMENTS

| | | | |
|---|---|---|---|
| 4,735,129 A | 4/1988 | Sjoberg | |
| 4,793,241 A * | 12/1988 | Mano | F15B 15/2861 92/5 R |
| 4,896,584 A * | 1/1990 | Stoll | F15B 15/1414 92/5 R |
| 5,231,352 A * | 7/1993 | Huber | G01D 5/145 324/207.13 |
| 7,557,568 B2 * | 7/2009 | Terasaki | F15B 15/2861 324/207.2 |
| 10,570,934 B2 * | 2/2020 | Kudo | F15B 15/1419 |
| 2006/0197389 A1 | 9/2006 | Terasaki | |
| 2010/0314836 A1 | 12/2010 | Slack | |
| 2015/0075366 A1 | 3/2015 | Koontz | |

FOREIGN PATENT DOCUMENTS

| | | |
|---|---|---|
| CN | 201599273 U | 10/2010 |
| CN | 202628656 U | 12/2012 |
| CN | 105041772 A | 11/2015 |
| CN | 105387118 A | 3/2016 |
| CN | 205117882 U | 3/2016 |
| JP | 37-25908 U | 9/1962 |
| JP | 54-34892 U1 | 3/1979 |
| JP | 57-6803 | 2/1982 |
| JP | 63-157509 U | 10/1988 |
| JP | 63-195960 U | 12/1988 |
| JP | 10-2416 A | 1/1998 |
| JP | 11-82424 A | 3/1999 |
| JP | 11-230229 A | 8/1999 |
| JP | 2000-233333 A | 8/2000 |
| JP | 2003-120602 A | 4/2003 |
| JP | 2006-242341 A | 9/2006 |
| JP | 2011-185343 A | 9/2011 |
| JP | 2012-2325 A | 1/2012 |
| JP | 5435434 B2 | 3/2014 |
| RU | 2 509 016 C2 | 3/2014 |
| TW | M446250 U1 | 2/2013 |

OTHER PUBLICATIONS

Combined Chinese Office Action and Search Report dated Nov. 1, 2019, in Patent Application No. 201780048869.5 (with English translation), 16 pages.
Japanese Office Action dated Nov. 19, 2019 in Patent Application No. 2016-157593 (with English translation), 6 pages.
Combined Chinese Office Action and Search Report dated Nov. 15, 2019 in corresponding Chinese Patent Application No. 201780048860.4 (with Partial English Translation and English Translation of Category of Cited Documents) 10 pages.
Combined Russian Office Action and Search dated Oct. 30, 2019 in corresponding Russian Patent Application No. 2019106679/06(012905), (with English Translation), 12 pages.
Office Action dated Sep. 17, 2019 in Japanese Patent Application No. 2016-157593, 6 pages (with unedited computer generated English translation).
U.S. Appl. No. 16/324,428, filed Feb. 8, 2019, Tsukasa Odaka.
U.S. Appl. No. 16/324,297, filed Feb. 8, 2019, Tsukasa Odaka.
International Search Report dated Aug. 1, 2017, in PCT/JP2017/023526 filed on Jun. 27, 2017.
Korean Office Action dated Apr. 17, 2020, in Patent Application No. 10-2019-7006667, 13 pages (with unedited computer generated English translation).
Indian Office Action dated Apr. 20, 2020, in Patent Application No. 201947009109, 5 pages.
U.S. Office Acton dated Mar. 6, 2020 in 520208US.
Office Action dated May 11, 2020 in China Patent Application No. 201780048873.1 (with English-language translation); 17 pgs.
Office Action dated Apr. 29, 2020 in China Patent Application No. 201780048869.5 (with English-language translation); 17 pgs.

* cited by examiner

10A

HYDRAULIC FLUID DEVICE

TECHNICAL FIELD

The present invention relates to a fluid pressure device (hydraulic fluid device) provided with a piston.

BACKGROUND ART

Conventionally, various devices are known as fluid pressure devices provided with pistons. For example, fluid pressure cylinders including pistons displaced by the effect of supplied pressurized fluid are well known as means (actuators) for transporting workpieces and the like. A typical fluid pressure cylinder includes a cylinder tube, a piston disposed inside the cylinder tube so as to be movable in the axial direction, and a piston rod connected to the piston (for example, see Japanese Laid-Open Patent Publication No. 2003-120602 below). A packing composed of an elastic member is mounted on an outer circumferential part of the piston. In such a fluid pressure cylinder, when pressurized fluid such as air is supplied into the cylinder tube, the piston is pushed by the pressurized fluid and displaced in the axial direction. This also causes the piston rod connected to the piston to be displaced in the axial direction.

Moreover, a conventional fluid pressure cylinder often includes a magnet installed on an outer circumferential part of a piston and a magnetic sensor attached to an outer surface of a cylinder tube in order to detect the working position of the piston (for example, see Japanese Laid-Open Patent Publication No. 2006-242341).

SUMMARY OF INVENTION

In the conventional technologies including the magnet installed on the outer circumferential part of the piston, the magnet and the packing are disposed at different axial positions on the outer circumferential part of the piston. This leads to an increase in the axial dimension of the piston equipped with the magnet, compared with the piston without the magnet.

The present invention has been devised taking into consideration the aforementioned problems, and has the object of providing a fluid pressure device including a piston equipped with a magnet, which prevents axial dimension from increasing.

To achieve the above-described object, a fluid pressure device of the present invention includes a body having a slide hole inside the body, a piston unit movable in an axial direction inside the slide hole, and a piston rod protruding from the piston unit in the axial direction. The piston unit includes a packing member and a piston body including a packing mounting groove in which the packing member is mounted. The packing member includes a packing body containing an elastic member and circumferentially extending over an entire circumference of the piston body in a circumferential direction of the piston body, the packing body being provided with a magnet mounting groove having a depth in the axial direction of the piston unit, and a magnet mounted in the magnet mounting groove.

According to the fluid pressure device of the present invention adopting the above-described structure, the magnet mounting groove with a groove depth in the axial direction is formed in the packing body, and the magnet is mounted in the magnet mounting groove. Thus, no additional space is required to be left for the magnet at an axial position different from a position where the packing is disposed. Consequently, an increase in the axial dimension of the piston body due to the placement of the magnet is prevented.

In the above-described fluid pressure device, the magnet mounting groove may be formed in an area of the packing body that is not subjected to elastic compressive deformation when the packing body receives compressive load at a position between the piston body and an inner surface of the slide hole.

The above-described fluid pressure device may further include a rotation restricting mechanism configured to restrict rotation of the piston unit relative to the body. The magnet may be disposed in the packing body over a range less than the entire circumference of the packing body in the circumferential direction.

In the above-described fluid pressure device, the rotation restricting mechanism may be a rotation prevention rod extending in the axial direction of the piston unit inside the body and inserted into the piston body.

In the above-described fluid pressure device, one of the piston body and the packing member may be provided with an anti-rotation protrusion protruding in the axial direction, the other of the piston body and the packing member may be provided with an anti-rotation recess recessed in the axial direction, and the anti-rotation protrusion may be inserted into the anti-rotation recess.

In the above-described fluid pressure device, the piston rod may be rotatable relative to the piston body.

In the above-described fluid pressure device, the magnet mounting groove and the magnet each may have a ring shape circumferentially extending over the entire circumference of the packing body in a circumferential direction of the packing body.

In the above-described fluid pressure device, the piston body may include a plurality of members including a first piston member and a second piston member, and a combination of at least two members of the plurality of members may define the packing mounting groove.

In the above-described fluid pressure device, one or both of the first piston member and the second piston member may be provided with a lightening portion having a depth in the axial direction.

In the above-described fluid pressure device, the lightening portion may have a through-hole passing through only one of the first piston member and the second piston member in the axial direction.

In the above-described fluid pressure device, the lightening portion may include a plurality of lightening portions disposed at intervals in the circumferential direction.

In the above-described fluid pressure device, the first piston member and the second piston member may be castings.

The above-described fluid pressure device may be configured as a fluid pressure cylinder, a valve device, a length-measurement cylinder, a sliding table, or a chuck device.

According to the fluid pressure device of the present invention, the axial dimension of the piston is prevented from increasing even though the piston equipped with the magnet is adopted.

DESCRIPTION OF EMBODIMENTS

Preferred embodiments of a fluid pressure device according to the present invention will be described in detail below with reference to the accompanying drawings.

Figure 1:
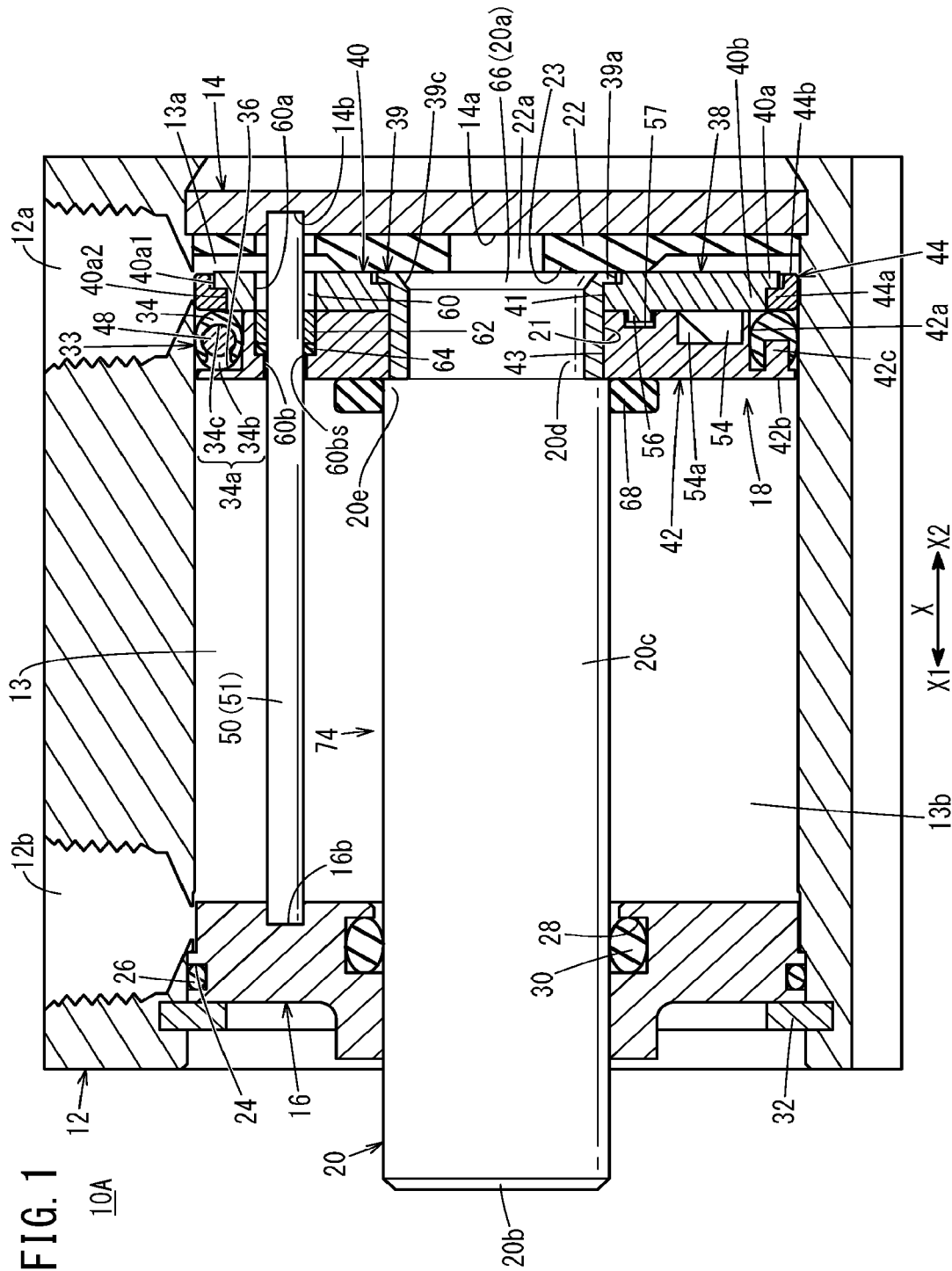
FIG. 1 is a cross-sectional view of a fluid pressure cylinder according to a first embodiment of the present invention.

A fluid pressure cylinder 10A, illustrated in FIG. 1 as an example of a fluid pressure device of the present invention, is provided with a cylinder tube 12 (body) having a hollow tubular shape, a head cover 14 disposed at one end portion of the cylinder tube 12, a rod cover 16 disposed at another end portion of the cylinder tube 12, a piston unit 18 disposed inside the cylinder tube 12 so as to be movable in the axial direction (direction of an arrow X), and a piston rod 20 connected to the piston unit 18. The piston unit 18 and the piston rod 20 constitute a piston assembly 74. The fluid pressure cylinder 10A is used as an actuator for, for example, transporting a workpiece.

The cylinder tube 12 is a tubular structure composed of, for example, a metal material such as aluminum alloy extending in the axial direction. In this embodiment, the cylinder tube 12 has a hollow cylindrical shape. The cylinder tube 12 has a first port 12a disposed on one end side in the axial direction (end located in the direction of an arrow X2), a second port 12b disposed on another end side in the axial direction (end located in the direction of an arrow X1), and a slide hole 13 (cylinder chamber) communicating with the first port 12a and the second port 12b.

The head cover 14 is a plate-shaped structure composed of, for example, a metal material similar to the material of the cylinder tube 12 and closes the one end portion (end portion located in the direction of the arrow X2) of the cylinder tube 12. The head cover 14 hermetically closes the one end portion of the cylinder tube 12.

A first damper 22 is disposed on an inner wall surface 14a of the head cover 14. The first damper 22 is composed of, for example, an elastic material such as rubber or elastomer. The material of the first damper 22 includes, for example, urethane. In this embodiment, the first damper 22 has a ring shape with a through-hole 22a in a central part.

The first damper 22 is provided with an expanding portion 23 disposed on the central part of the first damper 22 and expanding toward the rod cover 16 (toward the piston rod 20 and the piston unit 18). In the first damper 22, the thickness of the expanding portion 23 is larger than the thickness of an outer peripheral part disposed radially outside the expanding portion 23. The expanding portion 23 can be brought into abutment with the piston rod 20 and the piston unit 18 when the piston rod 20 and the piston unit 18 are displaced toward the head cover 14.

The rod cover 16 is a circular ring-shaped member composed of, for example, a metal material similar to the material of the cylinder tube 12 and closes the other end portion (end portion located in the direction of the arrow X1) of the cylinder tube 12. An outer annular groove 24 is formed in an outer circumferential part of the rod cover 16. An outer sealing member 26 composed of an elastic material is mounted in the outer annular groove 24 in order to seal a gap between the outer circumferential surface of the rod cover 16 and the inner circumferential surface of the slide hole 13.

An inner annular groove 28 is formed in an inner circumferential part of the rod cover 16. An inner sealing member 30 composed of an elastic material is mounted in the inner annular groove 28 in order to seal a gap between the inner circumferential surface of the rod cover 16 and the outer circumferential surface of the piston rod 20. The rod cover 16 is locked by a stopper 32 secured to an inner circumferential part of the cylinder tube 12 on the other end side.

The piston unit 18 is accommodated inside the cylinder tube 12 (slide hole 13) so as to be slidable in the axial direction and partitions the interior of the slide hole 13 into a first pressure chamber 13a on the first port 12a side and a second pressure chamber 13b on the second port 12b side. In this embodiment, the piston unit 18 is connected to one end portion 20a (hereinafter referred to as "base end portion 20a") of the piston rod 20.

Figure 2:
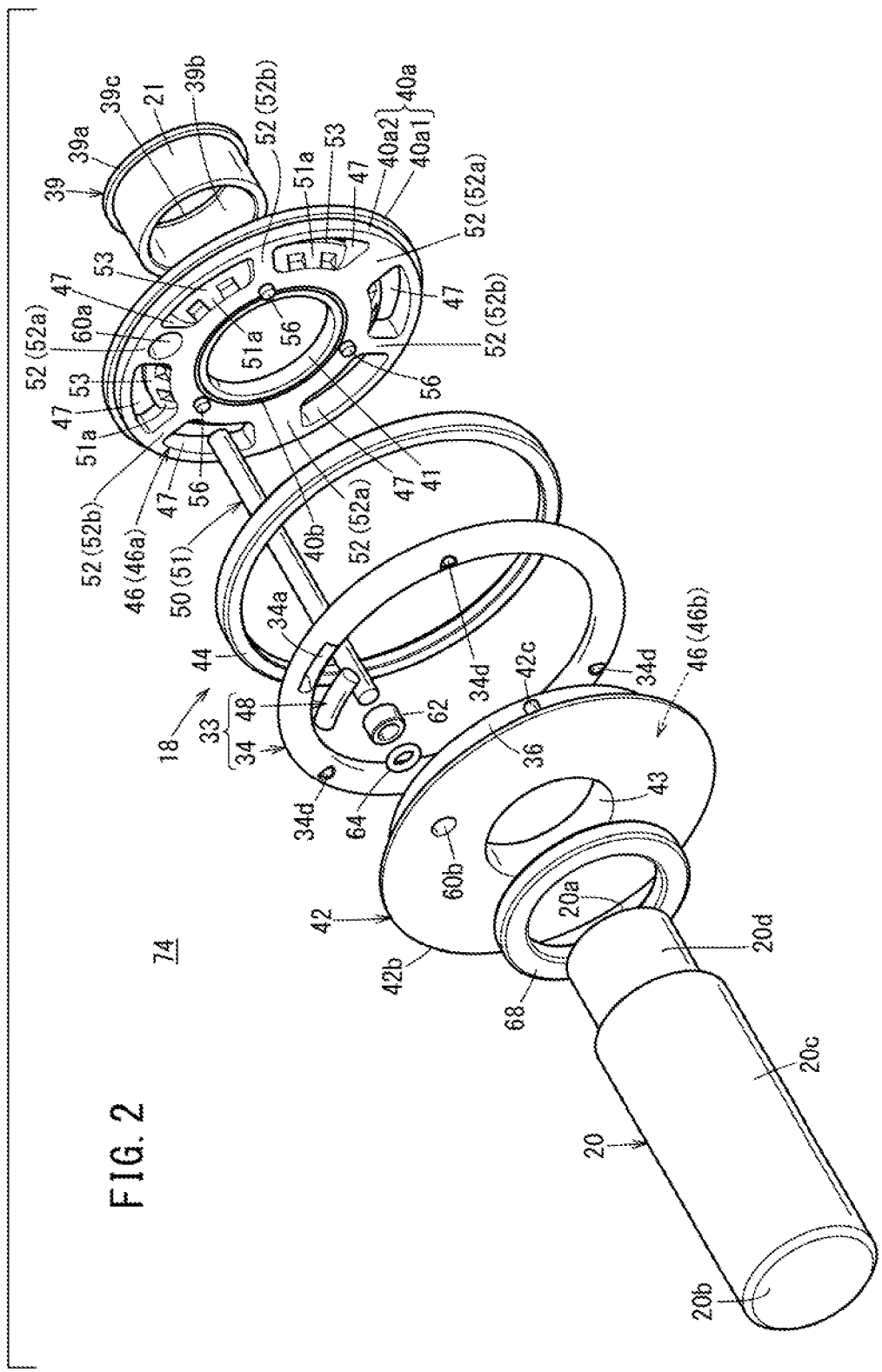
FIG. 2 is an exploded perspective view of a piston assembly of the fluid pressure cylinder illustrated in FIG. 1.

As illustrated in FIG. 1, the piston unit 18 includes a packing body 34 and a piston body 38 provided with a packing mounting groove 36. As illustrated in FIGS. 1 and 2, the piston body 38 is provided with a first piston member 40, a second piston member 42, a wear ring 44 (supporting member), and a packing member 33.

The first piston member 40 is a ring-shaped member with a rod insertion hole 41 on an inner side thereof, and the base end portion 20a of the piston rod 20 is inserted into the first piston member 40. The base end portion 20a of the piston rod 20 is crimped or deformed by pressing to secure the first piston member 40 to the piston rod 20.

A wear ring supporting portion 40a supporting the wear ring 44 is formed in the outer circumference of the first piston member 40. The wear ring supporting portion 40a includes a large diameter section 40a1 and a small diameter section 40a2. The difference in the outer diameter between the large diameter section 40a1 and the small diameter section 40a2 forms a stepped portion in the outer circumference of the wear ring supporting portion 40a.

The material of the first piston member 40 includes, for example, metal materials such as carbon steel, stainless steel, and aluminum alloy, and hard resin. In this embodiment, the first piston member 40 is shaped by casting. The first piston member 40 may also be shaped by injection molding.

The second piston member 42 is a ring-shaped member with a rod insertion hole 43 in an inner part of the member and is disposed adjacent to the first piston member 40. That is, the first piston member 40 and the second piston member 42 are laminated in the axial direction. In this embodiment, the second piston member 42 is shaped by casting. The second piston member 42 may also be shaped by injection molding.

The second piston member 42 includes on the outer circumference a packing supporting portion 42a supporting the inner circumference of the packing body 34 and a flange portion 42b protruding radially outward beyond the packing supporting portion 42a. The outer diameter of the packing supporting portion 42a is smaller than the outer diameter of the small diameter section 40a2 of the first piston member 40. The flange portion 42b circumferentially extends over the entire circumference in the circumferential direction. In this embodiment, the first piston member 40, the second piston member 42, and the wear ring 44 jointly form the ring-shaped packing mounting groove 36.

The piston body 38 is connected to (supported by) the piston rod 20 via a holder 39. The holder 39 is an annular member composed of a hard material including, for example, metal materials such as carbon steel, bearing steel, stainless steel, and aluminum alloy, and hard resin. The holder 39 has a flange portion 39a protruding radially outward and circumferentially extending over the entire circumference in the circumferential direction, at an end thereof located in the direction of the arrow X2.

The insertion shaft portion 20d of the piston rod 20 is inserted into a hole 39b of the holder 39. In the holder 39, an end portion thereof located in the direction of the arrow X1 is locked by a locking shoulder 20e of the piston rod 20 and another end portion thereof located in the direction of the arrow X2 is locked by a crimped portion 66 of the piston rod 20, whereby the holder 39 is non-rotatably secured to the insertion shaft portion 20d of the piston rod 20.

The first piston member 40 and the second piston member 42 are stacked in the axial direction on the outer circumference of the holder 39. The holder 39 including the flange portion 39a, and the locking shoulder 20e of the piston rod 20 jointly form an annular groove 21. Engagement of the inner circumferences of the first piston member 40 and the second piston member 42 with the annular groove 21 prevents axial movement of the piston unit 18 relative to the piston rod 20. The holder 39 is rotatable with respect to the first piston member 40 and the second piston member 42. Consequently, the piston rod 20 is rotatable relative to the piston unit 18 about the axis of the piston rod 20.

As illustrated in FIG. 1, the fluid pressure cylinder 10A according to this embodiment is further provided with a rotation restricting mechanism 50 for restricting (preventing) rotation of the piston unit 18 relative to the cylinder tube 12. Specifically, the rotation restricting mechanism 50 includes a rotation prevention rod 51. The rotation prevention rod 51 extends parallel to the axial direction of the piston rod 20 (in the direction along which the piston unit 18 slides) and is inserted into an insertion hole 60 formed in the first piston member 40 and the second piston member 42.

An end portion of the rotation prevention rod 51 adjacent to the rod cover 16 is fitted into a fitting groove 16b formed in the rod cover 16. An end portion of the rotation prevention rod 51 adjacent to the head cover 14 is fitted into a fitting groove 14b formed in the head cover 14. Thus, the rotation prevention rod 51 is fixed at a predetermined position inside the cylinder tube 12 so as to be non-rotatable inside the cylinder tube 12.

The insertion hole 60 includes a first insertion hole 60a formed in the first piston member 40 and a second insertion hole 60b formed in the second piston member 42. The first insertion hole 60a and the second insertion hole 60b communicate with each other. The first insertion hole 60a passes through the first piston member 40 in the thickness direction. The second insertion hole 60b passes through the second piston member 42 in the thickness direction.

A bush 62 and a gasket 64 both having an annular shape are disposed inside the second insertion hole 60b. The bush 62 is slidable in the axial direction (direction of the arrow X) with respect to the rotation prevention rod 51 together with the second piston member 42. The bush 62 prevents the first piston member 40 and the second piston member 42 from coming into direct contact with the rotation prevention rod 51. The material of the bush 62 includes, for example, hard resin, bearing steel, and other appropriate materials.

The gasket 64 is held between the bush 62 and a stepped portion 60bs formed on an inner circumferential part of the second insertion hole 60b. The gasket 64 is in liquid tight or airtight contact with the second piston member 42 and the rotation prevention rod 51 and in sliding contact with the rotation prevention rod 51. The gasket 64 prevents pressurized fluid from flowing between the first pressure chamber 13a and the second pressure chamber 13b via the insertion hole 60. The material of the gasket 64 includes an elastic material such as rubber and elastomer.

Figure 3:
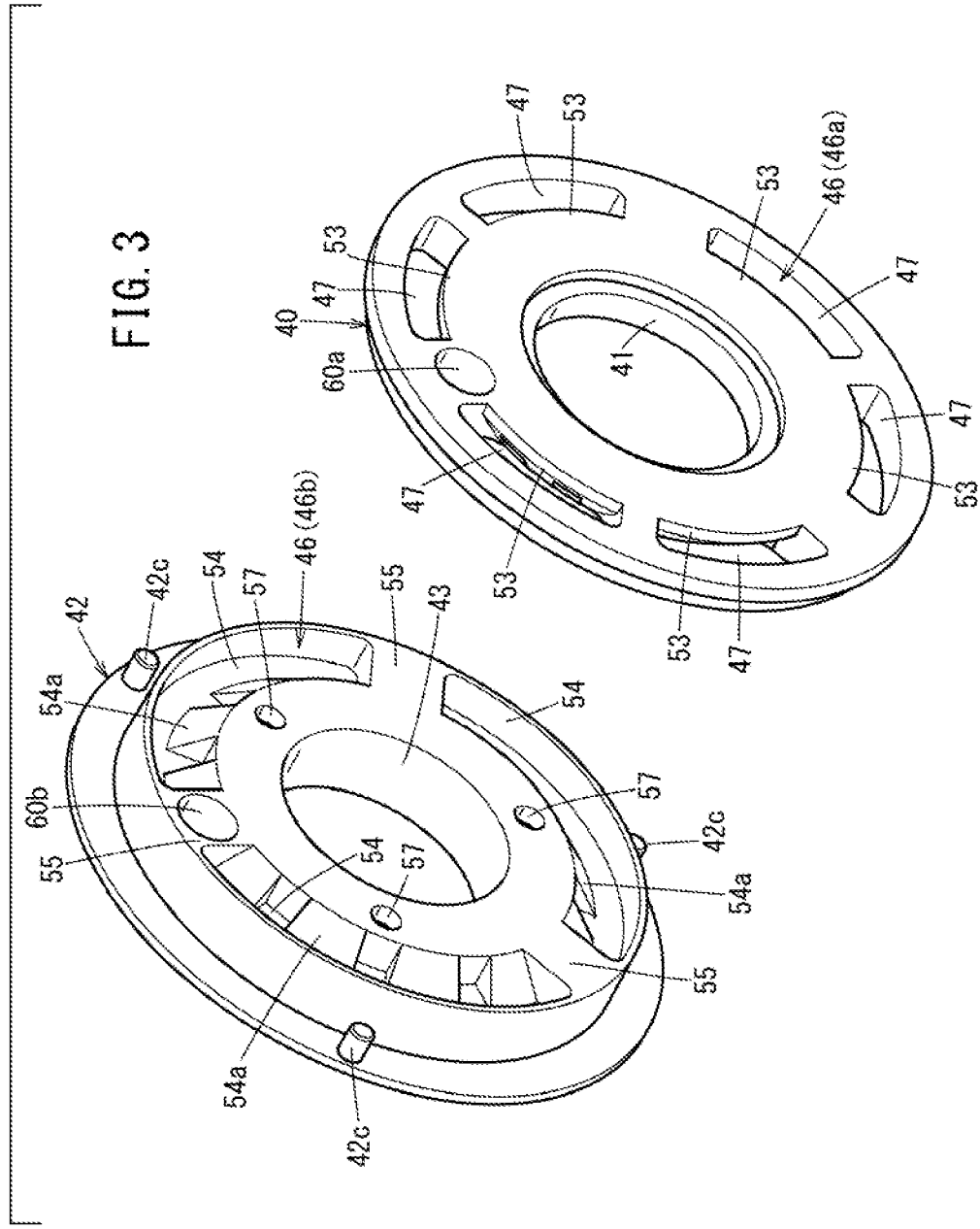
FIG. 3 is a perspective view of a first piston member and a second piston member.

As illustrated in FIGS. 2 and 3, the first piston member 40 and the second piston member 42 are each provided with a lightening portion 46. In this embodiment, the lightening portions 46 include a first lightening portion 46a provided for the first piston member 40 and a second lightening portion 46b provided for the second piston member 42.

The first lightening portion 46a has a plurality of (six in FIG. 2) through-holes 47 penetrating in the axial direction. The plurality of through-holes 47 are arranged at intervals in the circumferential direction. In the first piston member 40, a plurality of rims 52 extending in the radial direction are each disposed between two circumferentially adjacent through-holes 47. The plurality of rims 52 include a plurality of first rims 52a disposed at intervals in the circumferential direction and a plurality of second rims 52b each disposed between two circumferentially adjacent first rims 52a. The circumferential width of the second rims 52b is smaller than the circumferential width of the first rims 52a. The first insertion hole 60a described above is formed in one of the first rims 52a. The circumferential width of the first rims 52a may be identical to the circumferential width of the second rims 52b.

As illustrated in FIG. 2, the first piston member 40 is provided with wall portions 53 protruding outwardly toward the through-holes 47. The first piston member 40 is also provided with a plurality of ribs 51a reinforcing the wall portions 53. The plurality of ribs 51a are disposed at intervals in the circumferential direction.

As illustrated in FIG. 3, the second lightening portion 46b has a plurality of (three in FIG. 3) bottomed grooves 54 having a depth in the axial direction, but does not have through-holes extending in the axial direction. The plurality of grooves 54 are arranged at intervals in the circumferential direction. Each groove 54 has an arc shape extending in the circumferential direction. Each groove 54 is provided with reinforcing ribs 54a. In each groove 54, the plurality of reinforcing ribs 54a are disposed at intervals in the circumferential direction.

In the second piston member 42, abutting surfaces 55 brought into abutment with the end surfaces of the first rims 52a of the first piston member 40 are each formed between two circumferentially adjacent grooves 54. Since the second piston member 42 is provided with the abutting surfaces 55, when a load is applied in the axial direction to the stack of the first piston member 40 and the second piston member 42 in an assembly process of the piston assembly 74, the abutting surfaces 55 can receive the load from the first piston member 40. Incidentally, the second rims 52b of the first piston member 40 are shifted in position from the abutting surfaces 55 in the circumferential direction and thus are not brought into contact with the abutting surfaces 55.

As illustrated in FIGS. 1 and 2, the first piston member 40 is provided with a plurality of positioning protrusions 56 protruding in the axial direction. In FIG. 2, the plurality of positioning protrusions 56 are disposed at intervals in the circumferential direction. As illustrated in FIGS. 1 and 3, the second piston member 42 is provided with a plurality of positioning recesses 57 recessed in the axial direction. In FIG. 3, the plurality of positioning recesses 57 are arranged at intervals in the circumferential direction. The positioning protrusions 56 are inserted in the respective positioning recesses 57.

Contrary to the above-described structure, the second piston member 42 may be provided with the positioning protrusions 56, and the first piston member 40 may be provided with the positioning recesses 57. Only one positioning protrusion 56 and the corresponding positioning recess 57 may be provided for the respective piston members. During an assembly process of the piston assembly 74 described below, the positioning protrusions 56 and the positioning recesses 57 prevent the first piston member 40 and the second piston member 42 from rotating relative to each other.

As illustrated in FIG. 2, an annular projection 40b is formed on an end surface of the first piston member 40 adjacent to the second piston member 42. In the assembly process of the piston assembly 74, the annular projection 40b is brought into abutment with the opposing end surface of the second piston member 42 and plastically deformed to thereby closely contact the opposing end surface. As a result, an airtight or liquid-tight sealing portion is formed. Thus, the gap between the first piston member 40 and the second piston member 42 is air-tightly or liquid-tightly sealed to thereby prevent pressurized fluid from flowing via the gap between the inner circumferential surface of the second piston member 42 and the outer circumferential surface of the piston rod 20.

The annular projection 40b for sealing may be formed on the second piston member 42. The annular projection 40b may be formed radially outside the positioning protrusions 56 and radially inside the rims 52. Instead of providing the annular projection 40b on the first piston member 40 or the second piston member 42, an annular sealing member may be interposed between the first piston member 40 and the second piston member 42.

The packing member 33 includes the packing body 34 composed of an elastic member, and a magnet 48 mounted in the packing body 34.

The packing body 34 is a sealing member composed of an elastic body mounted on an outer circumferential part of the second piston member 42. The packing body 34 is mounted in the packing mounting groove 36. The packing body 34 has an annular shape circumferentially extending over the entire circumference of the piston body 38 in the circumferential direction.

The material of the packing body 34 includes an elastic material such as rubber and elastomer. The outer diameter of the packing body 34 is larger than the outer diameter of the wear ring 44 when the packing body 34 is in a natural state (when not disposed inside the slide hole 13 and not elastically compressed radially inward) and when the packing body 34 is disposed inside the slide hole 13.

The outer circumference of the packing body 34 airtightly or liquid-tightly contacts closely the inner circumferential surface of the slide hole 13 over the entire circumference. The inner circumference of the packing body 34 airtightly or liquid-tightly contacts closely the outer circumferential surface of the second piston member 42 (outer circumferential surface of the packing supporting portion 42a) over the entire circumference. The packing body 34 is elastically compressed radially between the inner circumferential surface of the slide hole 13 and the outer circumferential surface of the second piston member 42. The packing body 34 seals the gap between the outer circumferential surface of the piston unit 18 and the inner circumferential surface of the slide hole 13, and airtightly or liquid-tightly separates the first pressure chamber 13a and the second pressure chamber 13b from each other inside the slide hole 13.

The packing body 34 is provided with a magnet mounting groove 34a having a depth in the axial direction of the piston unit 18. As illustrated in FIG. 2, the magnet mounting groove 34a is formed in the packing body 34 in the circumferential direction over a range less than the entire circumference. That is, the magnet mounting groove 34a is formed in a part of the packing body 34 in the circumferential direction.

The magnet mounting groove 34a includes an opening portion 34b laterally opening on the packing body 34, and a holding portion 34c joining to the opening portion 34b and holding the magnet 48. The opening portion 34b opens toward the rod cover 16. The opening portion 34b may open toward the head cover 14. The opening width of the opening portion 34b is smaller than the diameter (inner diameter) of the holding portion 34c and the cross-sectional diameter of the magnet 48. This allows the magnet 48 to be stably held in the magnet mounting groove 34a.

The magnet mounting groove 34a is formed in an area of the packing body 34 that is not subjected to elastic compressive deformation in the radial direction when the packing body 34 receives radial compressive load at a position between the piston body 38 and the inner surface of the slide hole 13 (a state illustrated in FIG. 1). More specifically, in the state illustrated in FIG. 1, the packing body 34 is subjected to elastic compressive deformation only at a radially outer part and a radially inner part, and no elastic compressive deformation occurs in a radial range where the magnet mounting groove 34a is formed.

The magnet 48 is disposed in the packing body 34 over a range less than the entire circumference in the circumferential direction of the packing body 34. That is, the magnet 48 is disposed only in a part of the packing body 34 in the circumferential direction. The magnet 48 is, for example, a ferrite magnet, a rare earth magnet, or the like.

In this embodiment, the magnet 48 has an arc shape extending in the circumferential direction of the packing body 34. The circumferential length of the magnet 48 is set to be substantially identical to the circumferential length of the magnet mounting groove 34a. This prevents the magnet 48 from moving inside the magnet mounting groove 34a in the circumferential direction.

In FIG. 1, the magnet 48 has a circular cross-section. However, the cross-sectional shape of the magnet 48 may be, for example, elliptical or quadrangular instead of circular. A plurality of magnets 48 may be disposed in the packing body 34 at intervals in the circumferential direction. In this case, a plurality of magnet mounting groove 34a may be formed in the packing body 34 at intervals in the circumferential direction, and the magnets 48 may be mounted in the respective magnet mounting grooves 34a.

Magnetic sensors (not illustrated) are attached to the outer surface of the cylinder tube 12 at positions corresponding to both stroke ends of the piston unit 18. The magnetic sensors are disposed on the cylinder tube 12 at circumferential positions corresponding to the circumferential position of the magnet 48. The magnetic sensors detect magnetism generated by the magnet 48 to detect the working position of the piston unit 18.

As illustrated in FIGS. 1 and 2, the flange portion 42b of the second piston member 42 is provided with a plurality of anti-rotation protrusions 42c protruding toward the packing body 34. The plurality of anti-rotation protrusions 42c are disposed at intervals in the circumferential direction. The packing body 34 is provided with a plurality of anti-rotation recesses 34d having a groove depth in the axial direction (direction of the arrow X). The plurality of anti-rotation recesses 34d are disposed at intervals in the circumferential direction.

The plurality of anti-rotation protrusions 42c are inserted into the respective anti-rotation recesses 34d. This prevents the packing body 34 and the magnet 48 from rotating relative to the piston body 38. As described above, the rotation prevention rod 51 prevents the piston body 38 from rotating relative to the cylinder tube 12. Consequently, the magnet 48 is prevented from being displaced in the circumferential direction relative to the cylinder tube 12.

Contrary to the above-described structure, the packing body 34 may be provided with the anti-rotation protrusions 42c, and the second piston member 42 may be provided with the anti-rotation recesses 34d. The anti-rotation protrusions 42c may be formed on the first piston member 40. Only one anti-rotation protrusion 42c and the corresponding anti-rotation recess 34d may be provided on the packing body and the piston member.

The wear ring 44 is a member that prevents the outer circumferential surface of the first piston member 40 from coming into contact with the inner circumferential surface of the slide hole 13 when a large lateral load is applied to the piston unit 18 in directions perpendicular to the axial direction while the fluid pressure cylinder 10A is operating. The wear ring 44 is a circular ring-shaped member mounted on an outer circumferential part of the first piston member 40 so as to surround the outer circumferential part of the first piston member 40.

In this embodiment, the wear ring 44 includes a radial portion 44a extending radially and an axial portion 44b extending in the axial direction. The difference in the inner diameter between the radial portion 44a and the axial portion 44b forms a stepped portion on the inner circumference of the wear ring 44. The stepped portion in the outer circumferential part of the first piston member 40 described above engages with the stepped portion of the wear ring 44.

The wear ring 44 is composed of a low friction material. The frictional coefficient between the wear ring 44 and the inner circumferential surface of the slide hole 13 is smaller than the frictional coefficient between the packing body 34 and the inner circumferential surface of the slide hole 13. Such a low friction material includes, for example, synthetic resins with a low friction property and a high wear resistance such as polytetrafluoroethylene (PTFE) and metal materials (for example, bearing steel).

A second damper 68 composed of an elastic member is attached to an end of the piston unit 18 that is remote from the head cover 14 (an end located in the direction of the arrow X1). The second damper 68 may be composed of a material similar to the material of the first damper 22. The second damper 68 has a circular ring shape and is disposed on the outer circumferential surface of the piston rod 20. The second damper 68 is disposed adjoining a side of the second piston member 42 that is located in the direction of the arrow X1. That is, the second damper 68 is stacked on the second piston member 42 in the axial direction. During operation of the fluid pressure cylinder 10A (while the piston unit 18 reciprocates), the second damper 68 may be separate from the second piston member 42.

The fluid pressure cylinder 10A may exclude one of the first damper 22 and the second damper 68 or may exclude both of the first damper 22 and the second damper 68. The first damper 22 may be attached to the piston unit 18.

The piston rod 20 is a pillar-shaped (cylindrical) member extending in the axial direction of the slide hole 13. The piston rod 20 includes a rod body 20c passing through the rod cover 16 and an insertion shaft portion 20d having a diameter smaller than the diameter of the base end portion (end portion located in the direction of the arrow X2) of the rod body 20c and which protrudes in the axial direction. The difference in the outer diameter between the rod body 20c and the insertion shaft portion 20d forms a locking shoulder 20e. The holder 39 is attached and secured to the insertion shaft portion 20d while the insertion shaft portion 20d is inserted into the holder 39.

As illustrated in FIG. 1, a crimped portion 66 with a diameter increased radially outward is formed at an end part of the insertion shaft portion 20d (opposite end part remote from the rod body 20c). The crimped portion 66 is formed by plastically deforming the base end portion 20a of the piston rod 20. The crimped portion 66 engages with a tapered portion 39c formed on the inner circumferential edge of the holder 39 to thereby secure the holder 39 to the piston rod 20, whereby the first piston member 40 and the second piston member 42 are joined to the piston rod 20 via the holder 39.

The piston rod 20 passes through the rod cover 16. A distal end portion 20b, which is the opposite end of the base end portion 20a of the piston rod 20, is exposed to the outside of the slide hole 13.

The material of the piston rod 20 includes, for example, the material of the first piston member 40 (such as carbon steel). The piston rod 20 may be composed of a material identical to or different from the material of the first piston member 40.

Next, an example method of assembling (producing) the piston assembly 74 configured as above will be described.

For example, in an assembly process, the second damper 68, the second piston member 42, the packing member 33, the wear ring 44, and the first piston member 40 described above are moved in the axial direction on the piston rod 20, and are then assembled to the piston rod 20. Thus, the piston assembly 74 is obtained.

Specifically, in the assembly process, the second damper 68 is first moved toward the distal end portion 20b of the piston rod 20 such that the piston rod 20 is inserted into the second damper 68.

Next, the second piston member 42 is moved to thereby insert the insertion shaft portion 20d of the piston rod 20 into the rod insertion hole 43 of the second piston member 42. At this time, the second piston member 42 is locked by the locking shoulder of the piston rod 20.

Next, the packing member 33 with the magnet 48 being mounted in the magnet mounting groove 34a of the packing body 34, is moved in the axial direction of the piston rod 20, whereby the packing member 33 is mounted on the packing supporting portion 42a of the second piston member 42. In this case, unlike a conventional assembly method of mounting a packing in a packing mounting groove formed by cutting, the packing member 33 can be easily mounted on the outer circumferential part of the second piston member 42 without the need to pull the packing member radially outward for an increase in diameter.

When the packing member 33 is attached to the second piston member 42, the anti-rotation protrusions 42c provided on the second piston member 42 are inserted into the anti-rotation recesses 34d formed in the packing body 34. In this case, the packing member 33 is moved in the axial direction to be attached to the second piston member 42. Thus, the circumferential phases of the anti-rotation protrusions 42c and the anti-rotation recesses 34d can be easily caused to coincide with each other, and the anti-rotation protrusions 42c can be easily inserted into the anti-rotation recesses 34d.

Next, the gasket 64 and the bush 62 are inserted into the second insertion hole 60b of the second piston member 42.

Next, the wear ring 44 and the first piston member 40 are sequentially moved in the axial direction of the piston rod 20. This causes the second piston member 42 to be stacked on the first piston member 40 and further causes the wear ring 44 to be mounted on the outer circumferential part of the first piston member 40.

In this case, the positioning protrusions 56 provided on the first piston member 40 are inserted into the positioning recesses 57 formed in the second piston member 42. This causes the end surfaces of the first rims 52a of the first piston member 40 to come into abutment with the respective abutting surfaces 55 of the second piston member 42 (see FIG. 3). In this state, the engagement of the positioning protrusions 56 and the positioning recesses 57 prevents the first piston member 40 and the second piston member 42 from rotating relative to each other. Thus, the end surfaces of the first rims 52a and the abutting surfaces 55 remain in abutment with each other.

The first piston member 40 stacked on the second piston member 42, the second piston member 42, and the wear ring 44 disposed on the outer circumference of the first piston member 40 jointly form the packing mounting groove 36, and the packing member 33 is mounted in the packing mounting groove 36.

Subsequently, after the first piston member 40 and the second piston member 42 are assembled into a stacked state as described above, the annular projection 40b (see FIG. 2) formed on the first piston member 40 is pressed against the opposing end surface of the second piston member 42 by applying a load to the first piston member 40 and the second piston member 42 in the axial direction. This causes the annular projection 40b to be plastically deformed and compressed in the axial direction, resulting in a liquid tight or airtight seal formed at the contact point between the annular projection 40b and the end surface of the second piston member 42.

In this case, the end surfaces of the first rims 52a of the first piston member 40 are in abutment against the abutting surfaces 55 of the second piston member 42, and thus the abutting surfaces 55 can receive the load applied to the first piston member 40 and the second piston member 42 in the axial direction to form the seal. Consequently, although the second piston member 42 has the plurality of grooves 54 serving as the second lightening portion 46b, no large load is locally applied on the second piston member 42, and the second piston member 42 is therefore prevented from being damaged or undesirably deformed.

Next, the holder 39 is inserted between the first and second piston members 40, 42 and the insertion shaft portion 20d of the piston rod 20. Next, the base end portion 20a of the piston rod 20 is pressed and plastically deformed to be increased in diameter. This creates the crimped portion 66 (see FIG. 1). As a result, the holder 39 is firmly secured to the piston rod 20.

Next, the rotation prevention rod 51 is inserted into the insertion hole 60.

In this manner, assembling of the piston assembly 74 is completed. The sequence of assembling the piston assembly 74 may be changed as appropriate.

Next, the effects and advantages of the above-configured fluid pressure cylinder 10A illustrated in FIG. 1 will be described. In the fluid pressure cylinder 10A, the piston unit 18 is moved inside the slide hole 13 in the axial direction by action of pressurized fluid (for example, compressed air) introduced via the first port 12a or the second port 12b. This causes the piston rod 20 connected to the piston unit 18 to reciprocate.

Specifically, in order to displace (advance) the piston unit 18 toward the rod cover 16, the pressurized fluid is supplied from a pressurized fluid supply source (not illustrated) to the first pressure chamber 13a via the first port 12a while the second port 12b is open to the atmosphere. As a result, the pressurized fluid pushes the piston unit 18 toward the rod cover 16. Thus, the piston unit 18 is displaced (advanced) toward the rod cover 16 together with the piston rod 20. In this case, the piston unit 18 is also displaced with respect to the rotation prevention rod 51 while the rotation is restricted by the rotation prevention rod 51.

When the second damper 68 comes into contact with the end surface of the rod cover 16, the advancing motion of the piston unit 18 is stopped. In this case, the second damper 68 composed of an elastic material prevents the piston unit 18 and the rod cover 16 from coming into direct contact with each other. Thus, impact and impact noise occurring when the piston unit 18 reaches the advanced position (stroke end on the rod cover 16 side) are effectively prevented or reduced.

On the other hand, in order to displace (retract) the piston unit 18 toward the head cover 14, the pressurized fluid is supplied from the pressurized fluid supply source (not illustrated) to the second pressure chamber 13b via the second port 12b while the first port 12a is open to the atmosphere. As a result, the pressurized fluid pushes the piston unit 18 toward the head cover 14. Thus, the piston unit 18 is displaced toward the head cover 14. In this case, the piston unit 18 is also displaced with respect to the rotation prevention rod 51 while the rotation is restricted by the rotation prevention rod 51.

When the piston rod 20 and the first piston member 40 come into contact with the first damper 22 (expanding portion 23), the retracting motion of the piston unit 18 is stopped. In this case, the first damper 22 composed of an elastic material prevents the piston unit 18 and the head cover 14 from coming into direct contact with each other. Thus, impact and impact noise occurring when the piston unit 18 reaches the retracted position (stroke end on the head cover 14 side) are effectively prevented or reduced.

In this case, in the fluid pressure cylinder 10A, the magnet mounting groove 34a with a depth in the axial direction is formed in the packing body 34, and the magnet 48 is mounted in the magnet mounting groove 34a. Thus, no additional space is required to be left for the magnet at an axial position different from the position where the packing body 34 is disposed. Consequently, an increase in the axial dimension of the piston body 38 due to the placement of the magnet 48 is prevented.

In the fluid pressure cylinder 10A, the magnet mounting groove 34a is formed in an area of the packing body 34 that is not subjected to elastic compressive deformation in the radial direction when the packing body 34 receives radial compressive load at a position between the piston body 38 and the inner surface of the slide hole 13. Thus, the magnet 48 installed in the magnet mounting groove 34*a* does not receive any axial load and thus is prevented from being damaged.

The fluid pressure cylinder 10A is provided with the rotation restricting mechanism (rotation prevention rod 51) for restricting the rotation of the piston unit 18 relative to the cylinder tube 12. The magnet 48 is disposed in the packing body 34 over a range less than the entire circumference in the circumferential direction of the packing body 34. Thus, the magnet 48 is disposed only in a part of the packing body 34 in the circumferential direction, leading to a reduction in the usage of the magnet.

In the fluid pressure cylinder 10A, the anti-rotation protrusions 42*c* formed on the second piston member 42 are inserted into the anti-rotation recesses 34*d* formed in the packing body 34. Thus, the packing member 33 does not rotate relative to the piston body 38 in the circumferential direction, and the circumferential position of the magnet 48 is maintained. Consequently, the position of the piston unit 18 can be reliably detected by the magnetic sensors (not illustrated) attached to the cylinder tube 12.

In the fluid pressure cylinder 10A, the piston rod 20 is rotatable with respect to the piston body 38. Thus, the piston rod 20 can be rotated as required when the fluid pressure cylinder 10A is installed, increasing user convenience.

The fluid pressure cylinder 10A has the packing mounting groove 36 formed by a combination of a plurality of members (the first piston member 40, the second piston member 42 and the magnet 48). This leads to an increase in productivity, compared with a case where a groove in which the packing body 34 is mounted is formed by grooving (cutting). Moreover, the first piston member 40 and the second piston member 42 are shaped by casting or injection molding, and thus it is possible to significantly reduce the amount of material used for the fluid pressure cylinder, compared with a case of adopting a grooving process. Therefore, the present invention is economical and can achieve resource savings.

Furthermore, the first piston member 40 and the second piston member 42 are, for example, shaped by casting, and the first piston member 40 and the second piston member 42 are each provided with a lightening portion 46. This leads to a significant reduction in the amount of material to be used, compared with a conventional piston having a packing mounting groove formed by cutting and not having a lightening portion. Thus, the piston assembly is economical and can achieve resource savings. Moreover, the formation of the lightening portion 46 makes it possible to achieve a reduction in weight of the piston unit 18, and thus it is possible to achieve a reduction in consumption of the pressurized fluid. This advantageously leads to energy savings.

In addition, in this embodiment, the first piston member 40 has the through-holes 47 extending therethrough in the axial direction, as the first lightening portion 46*a*, and the second piston member 42 has the grooves 54 with a depth in the axial direction, as the second lightening portion 46*b*. Thus, a volume of the lightening portions 46 can be set to be larger, and the weight of the piston unit 18 can be further reduced. In particular, since plural through-holes 47 and plural grooves 54 are formed, the weight of the piston unit 18 can be significantly reduced.

In the above-described piston unit 18, the first piston member 40 has, as the lightening portion 46, the through-holes 47 extending therethrough in the axial direction, and the second piston member 42 has, as the lightening portion 46, the grooves 54 having a depth in the axial direction. However, the through-holes 47 and the grooves 54 may be arranged in an opposite manner. That is, the first piston member 40 may be provided with grooves (not illustrated) having a depth in the axial direction, and the second piston member 42 may be provided with through-holes (not illustrated) extending therethrough in the axial direction.

In the piston unit 18 described above, the wear ring 44 may be omitted. In the piston unit 18 described above, the packing supporting portion 42*a* is provided on the second piston member 42. However, the packing supporting portion 42*a* may be provided on the first piston member 40.

The fluid pressure cylinder 10A described above adopts the piston assembly 74 provided with the piston rod 20 protruding toward only one side of the piston unit 18. However, the fluid pressure cylinder 10A may adopt a piston assembly (not illustrated) provided with a piston rod protruding toward both sides of the piston unit 18.

In this case, the piston rod protruding toward both sides of the piston unit 18 may have either a solid structure or a hollow structure. Moreover, the piston rod protruding toward both sides of the piston unit 18 may include a first rod portion and a second rod portion connected with each other in the axial direction by screw-engagement, and the piston body 38 may be held between the first rod portion and the second rod portion.

Next, fluid pressure cylinders 10B to 10G respectively according to second to seventh embodiments will be described.

Figure 4:
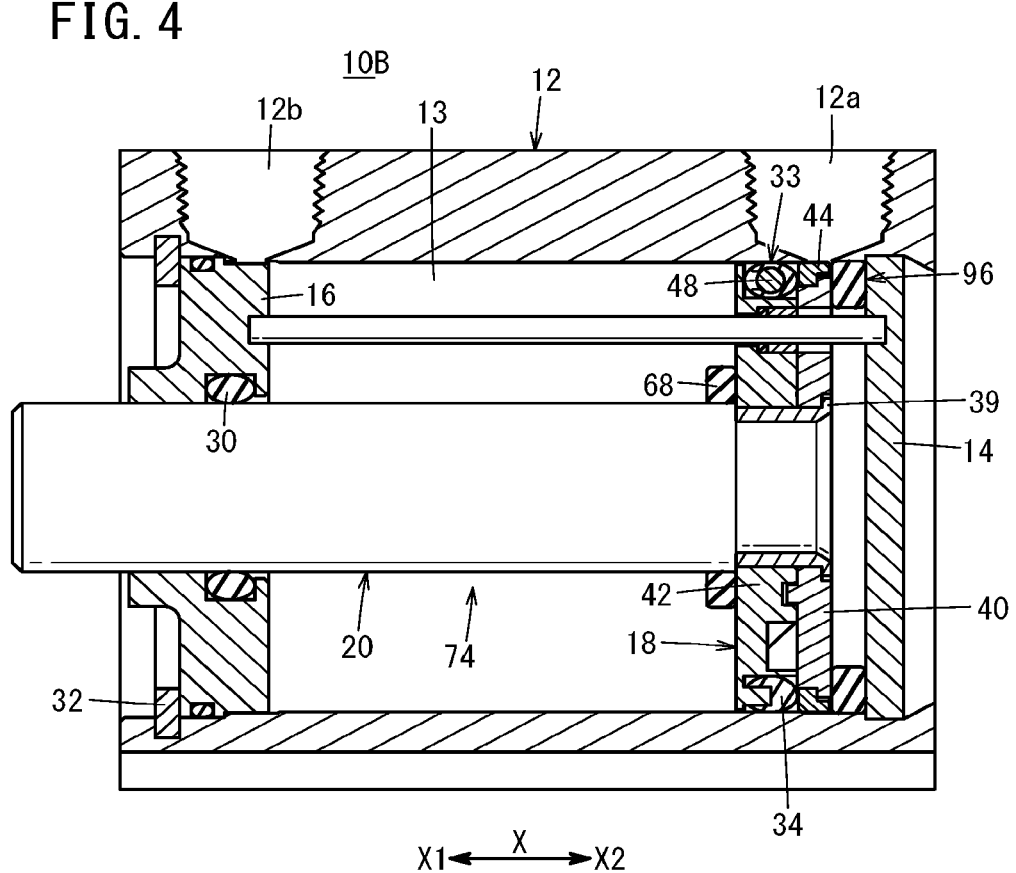
FIG. 4 is a cross-sectional view of a fluid pressure cylinder according to a second embodiment of the present invention.

The fluid pressure cylinder 10B according to the second embodiment illustrated in FIG. 4 adopts a first damper 96, having a structure different from the structure of the first damper 22 in the fluid pressure cylinder 10A illustrated in FIG. 1, instead of the first damper 22. As is the first damper 22, the first damper 96 is composed of an elastic material such as rubber. The structure of the fluid pressure cylinder 10B is identical to the structure of the fluid pressure cylinder 10A except for the first damper 96.

The first damper 96 prevents or reduces impact and impact noise by abutment against the piston unit 18 when the piston unit 18 moves in the direction of the arrow X2 and then reaches the retracted position. The first damper 96 has a ring shape and is attached to the inner wall surface 14*a* of the head cover 14.

The inner diameter of the first damper 96 is larger than the outer diameter of the piston rod 20. The outer diameter of the first damper 96 is substantially identical to the outer diameter of the piston unit 18. Thus, the first damper 96 has a larger effective volume compared with the first damper 22 illustrated in FIG. 1. Consequently, the first damper 96 more effectively prevents or reduces impact and impact noise occurring when the piston unit 18 reaches the retracted position.

Figure 5:
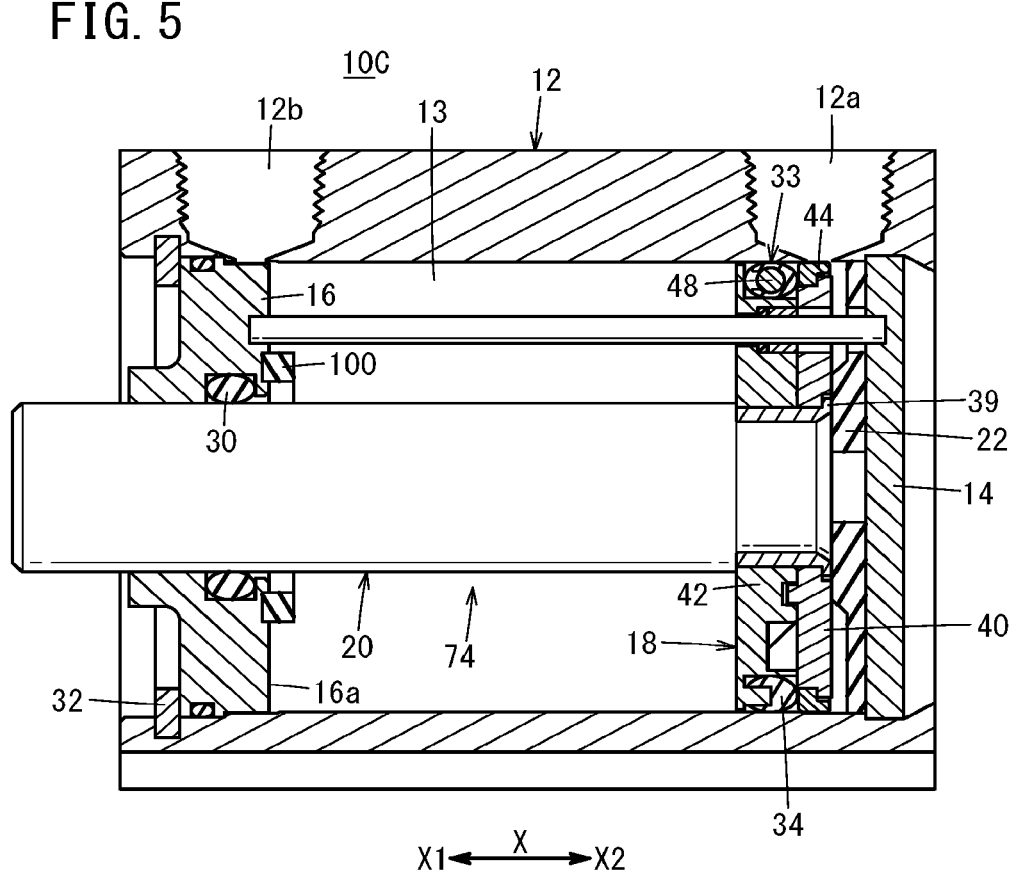
FIG. 5 is a cross-sectional view of a fluid pressure cylinder according to a third embodiment of the present invention.

The fluid pressure cylinder 10C according to the third embodiment illustrated in FIG. 5 has a second damper 100 on a surface 16*a* of the rod cover 16 facing the piston unit 18, instead of the second damper 68 provided on the piston unit 18 in the fluid pressure cylinder 10A illustrated in FIG. 1. The second damper 100 prevents or reduces impact and impact noise by coming into contact with the piston unit 18 when the piston unit 18 moves in the direction of the arrow X1 and reaches the advanced position. The structure of the fluid pressure cylinder 10C other than this is identical to the structure of the fluid pressure cylinder 10A.

Figure 6:
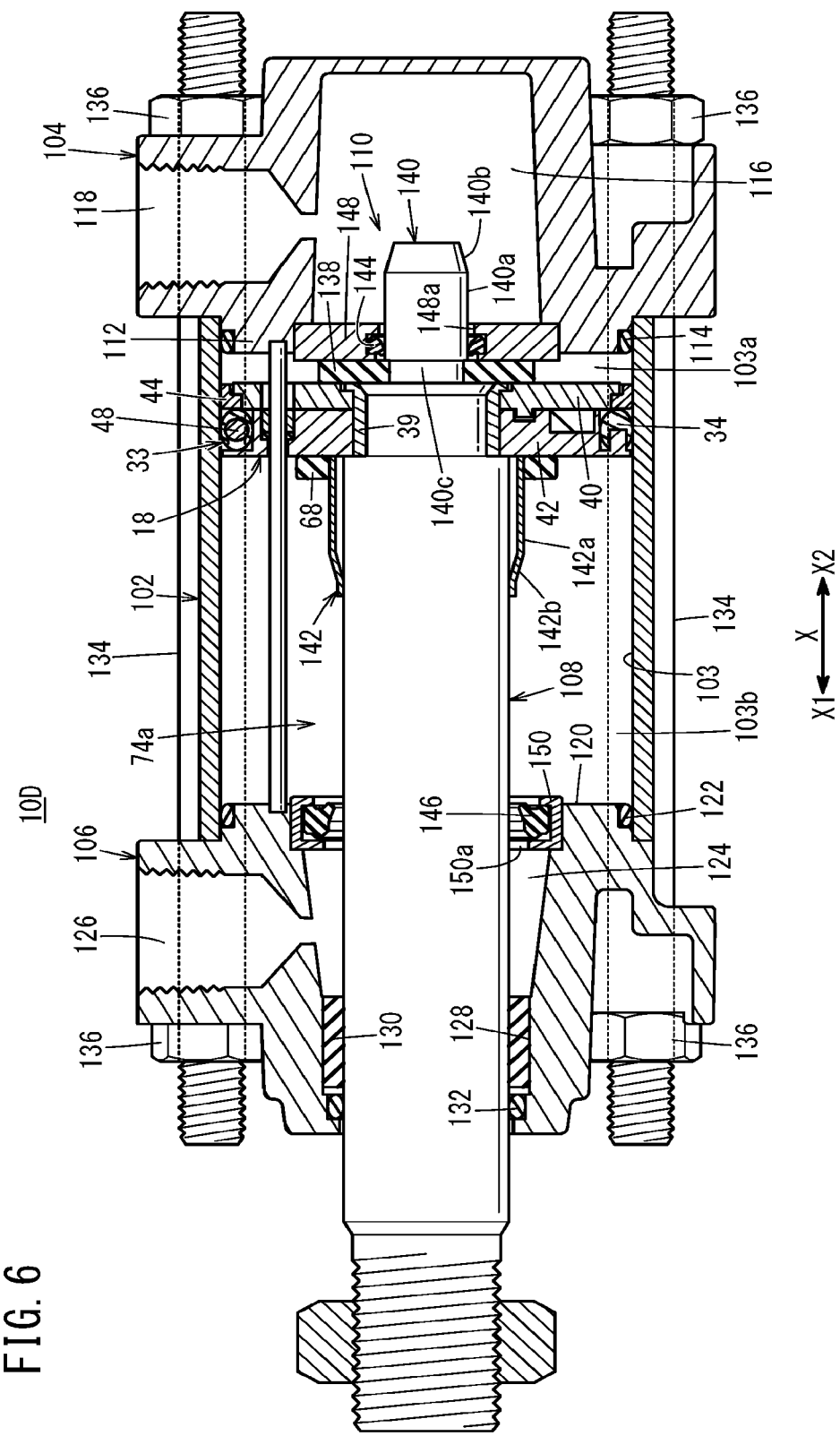
FIG. 6 is a cross-sectional view of a fluid pressure cylinder according to a fourth embodiment of the present invention.

The fluid pressure cylinder 10D according to the fourth embodiment illustrated in FIG. 6 is provided with a cylinder tube 102 (body) having a hollow cylindrical shape, a head cover 104 disposed at one end portion of the cylinder tube 102, a rod cover 106 disposed at another end portion of the cylinder tube 102, and a piston assembly 74a. The fluid pressure cylinder 10D is further provided with the piston unit 18 disposed inside the cylinder tube 102 so as to be movable in the axial direction (direction of the arrow X), a piston rod 108 connected to the piston unit 18, and a cushioning mechanism 110 relieving impact at one stroke end and the other stroke end of the piston unit 18.

The cylinder tube 102 has a cylindrical shape. A slide hole 103 (cylinder chamber) accommodating the piston unit 18 and which is closed by the head cover 104 and the rod cover 106, is formed inside the cylinder tube 102.

The head cover 104 includes a ring-shaped first stepped portion 112 protruding in the direction of the arrow X1, and the first stepped portion 112 is inserted into an end portion of the cylinder tube 102 located in the direction of the arrow X2. A gasket 114 is interposed between the outer circumference of the first stepped portion 112 and the cylinder tube 102. A first central hollow portion 116 and a first port 118 communicating with the first central hollow portion 116 are formed in the head cover 104. Pressurized fluid is supplied and discharged via the first port 118.

The rod cover 106 includes a ring-shaped second stepped portion 120 protruding in the direction of the arrow X2, and the second stepped portion 120 is inserted into an end portion of the cylinder tube 102 located in the direction of the arrow X1. A gasket 122 is interposed between the outer circumference of the second stepped portion 120 and the cylinder tube 102. A second central hollow portion 124 and a second port 126 communicating with the second central hollow portion 124 are formed in the rod cover 106. Pressurized fluid is supplied and discharged via the second port 126.

A rod hole 128 is formed in the second central hollow portion 124 at an inner circumferential part of the rod cover 106 located in the direction of the arrow X1. A ring-shaped bush 130 guiding the piston rod 108 in the axial direction is disposed inside the rod hole 128. In addition, inside the rod hole 128, a packing 132 is disposed adjoining a side of the bush 130 located in the direction of the arrow X1. The packing 132 hermetically contacts the outer circumferential surface of the piston rod 108.

The cylinder tube 102, the head cover 104, and the rod cover 106 described above are fastened together in the axial direction by a plurality of connecting rods 134 and nuts 136. Thus, the cylinder tube 102 is secured while being supported and sandwiched between the head cover 104 and the rod cover 106.

The piston unit 18 is configured in a manner similar to the piston unit 18 in the first embodiment. The second damper 68 is disposed on an end of the piston unit 18 closer to the rod cover 106. A first damper 138 is disposed on an end of the piston unit 18 closer to the head cover 104. Details of the first damper 138 will be described later.

The cushioning mechanism 110 includes a first cushioning member 140 and a second cushioning member 142 (cushion ring) provided on a movable part (the piston rod 108) and also includes a ring-shaped first cushion seal 144 and a ring-shaped second cushion seal 146 composed of elastic members and provided on the fixed part (the head cover 104 and the rod cover 106).

The first cushioning member 140 is disposed at an end of the piston rod 108 located in the direction of the arrow X2 to be coaxial with the piston rod 108. Specifically, the first cushioning member 140 has a diameter smaller than the diameter of the piston rod 108 and protrudes from an end surface of the piston rod 108 in the direction of the arrow X2. The first cushioning member 140 has a hollow or solid cylindrical shape. The outer diameter of the first cushioning member 140 may be identical to or larger than the outer diameter of the piston rod 108.

The first cushioning member 140 may be a part integrated with the piston rod 108 or may be a separate part joined to the piston rod 108. In the case where the first cushioning member 140 is a part separate from the piston rod 108, the first cushioning member 140 may be joined to the piston rod 108 by joining means such as welding, bonding, and screwing.

The first cushioning member 140 includes a straight portion 140a and a tapered portion 140b on the outer circumference. The straight portion 140a has a fixed outer diameter in the axial direction. The tapered portion 140b is disposed adjoining an end of the straight portion 140a remote from the piston rod 108 (a side located in the direction of the arrow X2) and has a diameter gradually reducing in a direction away from the piston rod 108. The tapered portion 140b is an outer circumferential part of a free end portion of the first cushioning member 140.

A reduced-diameter portion 140c with a diameter smaller than the diameter of the straight portion 140a is formed at a base part (fixed end) of the first cushioning member 140. The reduced-diameter portion 140c forms an annular recess between the first cushioning member 140 and the piston rod 108. The annular recess engages with the inner circumference of the ring-shaped first damper 138 composed of an elastic member to thereby hold the first damper 138.

The first cushion seal 144 is held by the inner circumference of a ring-shaped first holder 148. The first holder 148 has a hole 148a passing through the first holder 148 in the axial direction and is secured to the inner circumference of the first stepped portion 112 of the head cover 104. While the first cushioning member 140 is not inserted into the hole 148a of the first holder 148, the slide hole 103 and the first central hollow portion 116 communicate with each other via the hole 148a.

The first cushion seal 144 protrudes inward from the inner circumferential surface of the first holder 148 defining the hole 148a. Thus, when the first cushioning member 140 is inserted into the hole 148a of the first holder 148, the first cushion seal 144 is brought into sliding contact with the outer circumferential surface of the first cushioning member 140 over the entire circumference.

The second cushioning member 142 is disposed next to a side of the piston unit 18 closer to the rod cover 106 (a side located in the direction of the arrow X1) to be coaxial with the piston rod 108 in the vicinity of the piston unit 18. The second cushioning member 142 is a ring-shaped member with a diameter larger than the diameter of the piston rod 108 and smaller than the diameter of the piston unit 18, and is joined to the outer circumferential surface of the piston rod 108 by, for example, welding or bonding. In FIG. 6, the outer diameter of the second cushioning member 142 is slightly larger than the outer diameter of the piston rod 108.

The second cushioning member 142 includes a straight portion 142a and a tapered portion 142b on the outer circumference. The straight portion 142a has a fixed outer diameter in the axial direction. The tapered portion 142b is disposed adjoining an end of the straight portion 142a located in the direction of the arrow X1 (a side closer to the rod cover 106) and has a diameter gradually reducing in the direction of the arrow X1.

The second cushion seal 146 is held by the inner circumference of a ring-shaped second holder 150. The second holder 150 has a hole 150a passing through the second holder 150 in the axial direction and is secured to the inner circumference of the second stepped portion 120 of the rod cover 106. When the second cushioning member 142 is not inserted into the hole 150a of the second holder 150, the slide hole 103 and the second central hollow portion 124 communicate with each other via the hole 150a.

The second cushion seal 146 protrudes inward from the inner circumferential surface of the second holder 150 defining the hole 150a. Thus, when the second cushioning member 142 is inserted into the hole 150a of the second holder 150, the second cushion seal 146 is brought into sliding contact with the outer circumferential surface of the second cushioning member 142 over the entire circumference.

Next, the operation of the fluid pressure cylinder 10D configured as above will be described. In the description below, air (compressed air) will be used as pressurized fluid. However, gas other than air may be used.

In the fluid pressure cylinder 10D, the piston unit 18 is moved inside the slide hole 103 in the axial direction by action of pressurized fluid introduced via the first port 118 or the second port 126. This causes the piston rod 108 connected to the piston unit 18 to reciprocate.

Specifically, while the piston unit 18 is located at the retracted position illustrated in FIG. 6, the second port 126 is opened to the atmosphere, and air is supplied from a pressurized fluid supply source (not illustrated) to a first pressure chamber 103a via the first port 118, the first central hollow portion 116, and the hole 148a. The air pushes the piston unit 18 toward the rod cover 106. This causes the piston unit 18 to be displaced (advanced) toward the rod cover 106 together with the piston rod 108. In this case, the air inside a second pressure chamber 103b is discharged from the second port 126 via the hole 150a of the second holder 150 and the second central hollow portion 124.

When the second damper 68 comes into abutment against the second holder 150, the advancing motion of the piston unit 18 is stopped. Thus, the second damper 68 relieves impact and impact noise occurring when the piston unit 18 reaches the advanced position (stroke end on the rod cover 106 side). The second damper 68 may have a size sufficiently large to come into abutment against the rod cover 106 (and the second holder 150) when the piston unit 18 reaches the advanced position.

When the piston unit 18 approaches the advanced position, the second cushioning member 142 is inserted into the hole 150a of the second holder 150. This causes the inner circumference of the second cushion seal 146 to come into contact with the outer circumferential surface (straight portion 142a) of the second cushioning member 142 and thus creates an airtight seal at the contact area. The airtight seal prevents the air from flowing from the second pressure chamber 103b to the second central hollow portion 124 via the hole 150a.

As a result, an air cushion is formed in the second pressure chamber 103b. The air cushion in the second pressure chamber 103b serves as displacement resistance during the displacement of the piston unit 18 toward the rod cover 106 and decelerates the displacement of the piston unit 18 in the vicinity of the stroke end on the rod cover 106 side. Consequently, impact occurring when the piston unit 18 reaches the stroke end is further relieved.

On the other hand, while the piston unit 18 is located at the advanced position (stroke end on the rod cover 106 side), the first port 118 is opened to the atmosphere, and air is supplied from the pressurized fluid supply source (not illustrated) to the second pressure chamber 103b via the second port 126, the second central hollow portion 124, and the hole 150a. The air pushes the piston unit 18 toward the head cover 104. This causes the piston unit 18 to be displaced (retracted) toward the head cover 104. In this case, the air inside the first pressure chamber 103a is discharged from the first port 118 via the hole 148a of the first holder 148 and the first central hollow portion 116.

When the first damper 138 comes into abutment against the first holder 148, the retracting motion of the piston unit 18 is stopped. Thus, the first damper 138 relieves impact and impact noise occurring when the piston unit 18 reaches the retracted position (stroke end on the head cover 104 side).

When the piston unit 18 approaches the retracted position, the first cushioning member 140 is inserted into the hole 148a of the first holder 148. This causes the inner circumference of the first cushion seal 144 to come into contact with the outer circumferential surface (straight portion 140a) of the first cushioning member 140 and thus creates an airtight seal at the contact area. The airtight seal prevents the air from flowing from the first pressure chamber 103a to the first central hollow portion 116 via the hole 148a.

As a result, an air cushion is formed in the first pressure chamber 103a. The air cushion in the first pressure chamber 103a serves as displacement resistance during the displacement of the piston unit 18 toward the head cover 104 and decelerates the displacement of the piston unit 18 in the vicinity of the stroke end on the head cover 104 side. Consequently, impact occurring when the piston unit 18 reaches the stroke end is further relieved.

Figure 7A:
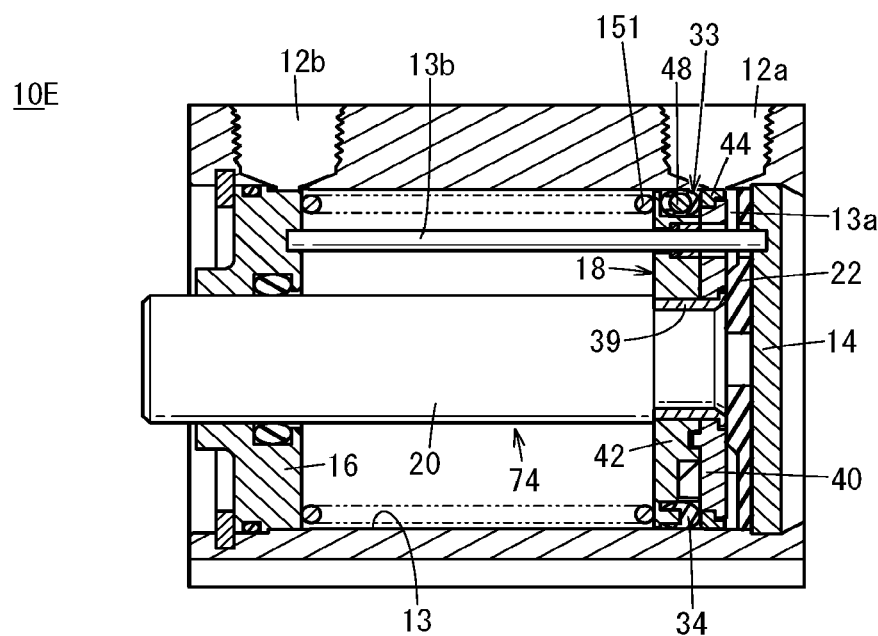
FIG. 7A is a cross-sectional view of a fluid pressure cylinder according to a fifth embodiment of the present invention.

The fluid pressure cylinder 10E according to the fifth embodiment illustrated in FIG. 7A is configured as a so-called single-acting cylinder. Specifically, the fluid pressure cylinder 10E has a structure similar to the structure of the fluid pressure cylinder 10A according to the first embodiment except that the second damper 68 is removed and that a spring 151 is alternatively disposed between the piston unit 18 and the rod cover 16. In this case, the second port 12b is open to the atmosphere.

In the fluid pressure cylinder 10E, when pressurized fluid is supplied to the first pressure chamber 13a via the first port 12a, the piston unit 18 is displaced (advanced) toward the rod cover 16 by the pressurized fluid and reaches the stroke end at the advanced position. When the supply of the pressurized fluid to the first port 12a is stopped and the first port 12a is opened to the atmosphere, the piston unit 18 is displaced (retracted) toward the head cover 14 by the elastic biasing force of the spring 151 and reaches the stroke end at the retracted position.

Figure 7B:
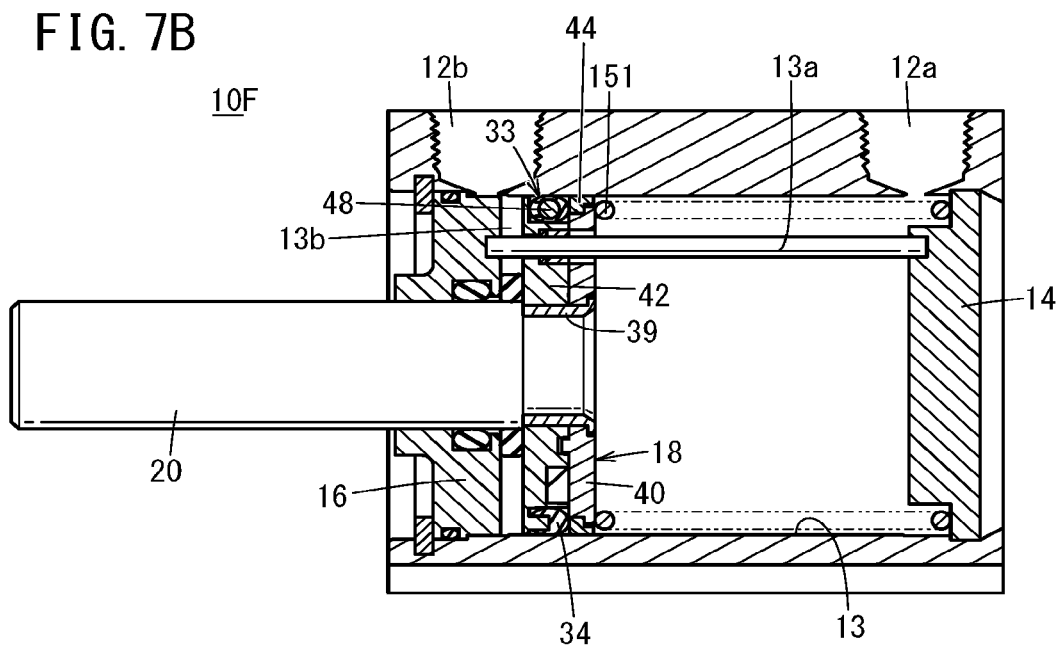
FIG. 7B is a cross-sectional view of a fluid pressure cylinder according to a sixth embodiment of the present invention.

The fluid pressure cylinder 10F according to the sixth embodiment illustrated in FIG. 7B is also configured as a so-called single-acting cylinder. Specifically, the fluid pressure cylinder 10F has a structure similar to the structure of the fluid pressure cylinder 10A according to the first embodiment except that the first damper 22 is removed and that the spring 151 is alternatively disposed between the piston unit 18 and the head cover 14. In this case, the first port 12a is opened to the atmosphere.

In the fluid pressure cylinder 10F, when pressurized fluid is supplied to the second pressure chamber 13b via the second port 12b, the piston unit 18 is displaced (retracted)

toward the head cover 14 by the pressurized fluid and reaches the stroke end at the retracted position. When the supply of the pressurized fluid to the second port 12b is stopped and the second port 12b is opened to the atmosphere, the piston unit 18 is displaced (advanced) toward the rod cover 16 by the elastic biasing force of the spring 151 and reaches the stroke end at the advanced position.

Figure 8:
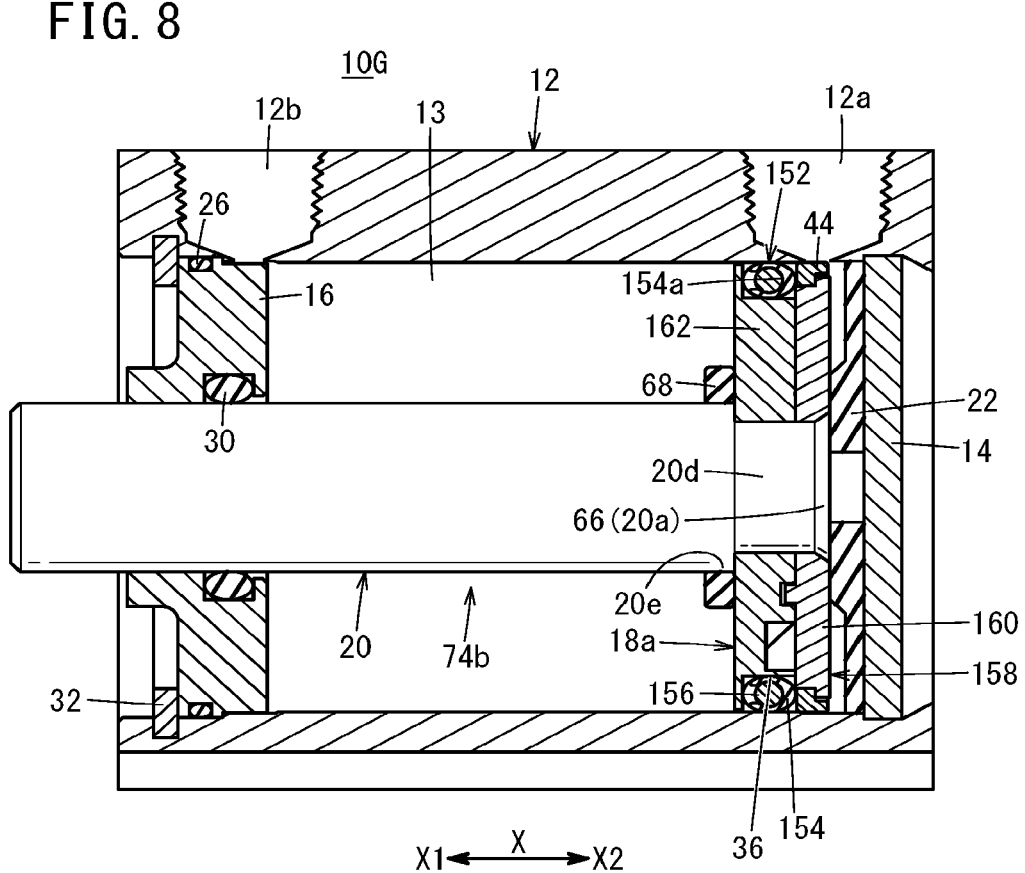
FIG. 8 is a cross-sectional view of a fluid pressure cylinder according to a seventh embodiment of the present invention.

The fluid pressure cylinder 10G according to the seventh embodiment illustrated in FIG. 8 has a structure similar to the structure of the fluid pressure cylinder 10A except that the rotation prevention rod 51 is removed and that an annular magnet 156 is adopted. Specifically, a piston assembly 74b of the fluid pressure cylinder 10G is provided with a piston unit 18a including a piston body 158 and the piston rod 20 connected to the piston unit 18a.

The annular packing mounting groove 36 is formed in the piston body 158, and an annular packing member 152 is mounted in the packing mounting groove 36. The packing member 152 includes a packing body 154 with an annular magnet mounting groove 154a formed therein, and the annular magnet 156. The annular magnet mounting groove 154a has a depth in the axial direction and circumferentially extends over the entire circumference in the circumferential direction. The magnet 156 is installed in the magnet mounting groove 154a and circumferentially extends over the entire circumference in the circumferential direction.

The piston body 158 includes a first piston member 160 and a second piston member 162. Neither the first piston member 160 nor the second piston member 162 includes the insertion hole 60 (see FIG. 1). The second piston member 162 is not provided with the anti-rotation protrusions 42c (see FIG. 1). Moreover, the packing body 154 is not provided with the anti-rotation recesses 34d (see FIG. 1).

The first piston member 160 and the second piston member 162 are disposed at the insertion shaft portion 20d of the piston rod 20 and fastened together in the axial direction by the crimped portion 66. Thus, the first piston member 160 and the second piston member 162 are non-rotatably secured to the insertion shaft portion 20d of the piston rod 20.

The first piston member 160 and the second piston member 162 are each provided with the lightening portion 46, as do the first piston member 40 and the second piston member 42.

In this manner, in the fluid pressure cylinder 10G, the magnet mounting groove 154a with a depth in the axial direction is formed in the packing body 154, and the magnet 156 is mounted in the magnet mounting groove 154a. Consequently, according to the fluid pressure cylinder 10G, an increase in the axial dimension of the piston body 158 due to the placement of the magnet 156 is prevented as in the fluid pressure cylinder 10A.

In the fluid pressure cylinders 10B to 10F respectively according to the second to sixth embodiments, the piston unit 18a illustrated in FIG. 8 may be adopted instead of the piston unit 18.

The present invention is not limited to the above-described embodiments, and various modifications can be made without departing from the scope of the present invention. For example, the present invention is applicable to fluid pressure cylinders provided with piston units and cylinder tubes with non-circular (quadrangular or elongated circular such as elliptical) cross-sections. In this case, the rotation prevention rod 51 is unnecessary. Moreover, the present invention is also applicable to multi-rod (such as dual rod) fluid pressure cylinders provided with a plurality of pistons and piston rods.

Yet moreover, the present invention is not limited to the fluid pressure cylinders used as actuators or the like, and is also applicable to different forms of fluid pressure device including pistons. The different forms of fluid pressure device equipped with pistons, to which the present invention is applicable, include, for example, a valve device for switching channels by moving a valve element using a piston, a length-measurement cylinder for measuring length by displacing a piston connected to a piston rod serving as an input shaft, a sliding table connected to a piston and configured to be displaced by displacing the piston via a piston rod, and a chuck device for gripping a workpiece using a gripping part that opens and closes by displacing a piston and then converting the displacement of a piston.

The invention claimed is:

1. A fluid pressure device comprising:
    a body having a slide hole inside the body;
    a piston unit movable in an axial direction inside the slide hole; and
    a piston rod protruding from the piston unit in the axial direction;
    wherein the piston unit includes a packing member and a piston body including a packing mounting groove in which the packing member is mounted; and
    wherein the packing member includes:
    a packing body comprising an elastic member and circumferentially extending over an entire circumference of the piston body in a circumferential direction of the piston body, the packing body being provided with a magnet mounting groove having a depth in the axial direction of the piston unit; and
    a magnet mounted in the magnet mounting groove.

2. The fluid pressure device according to claim 1, wherein the magnet mounting groove is formed in an area of the packing body that is not subjected to elastic compressive deformation when the packing body receives compressive load at a position between the piston body and an inner surface of the slide hole.

3. The fluid pressure device according to claim 1, further comprising:
    a rotation restricting mechanism configured to restrict rotation of the piston unit relative to the body;
    wherein the magnet is disposed in the packing body over a range less than an entire circumference of the packing body in a circumferential direction of the packing body.

4. The fluid pressure device according to claim 3, wherein the rotation restricting mechanism is a rotation prevention rod extending in the axial direction of the piston unit inside the body and inserted into the piston body.

5. The fluid pressure device according to claim 3, wherein one of the piston body and the packing member is provided with an anti-rotation protrusion protruding in the axial direction, another of the piston body and the packing member is provided with an anti-rotation recess recessed in the axial direction, and the anti-rotation protrusion is inserted into the anti-rotation recess.

6. The fluid pressure device according to claim 3, wherein the piston rod is rotatable relative to the piston body.

7. The fluid pressure device according to claim 1, wherein the magnet mounting groove and the magnet each have a ring shape circumferentially extending over an entire circumference of the packing body in a circumferential direction of the packing body.

8. The fluid pressure device according to claim 1, wherein:
    the piston body includes a plurality of members including a first piston member and a second piston member; and a combination of at least two members of the plurality of members defines the packing mounting groove.

9. The fluid pressure device according to claim 8, wherein one or both of the first piston member and the second piston member are provided with a lightening portion having a depth in the axial direction.

10. The fluid pressure device according to claim 9, wherein the lightening portion has a through-hole passing through only one of the first piston member and the second piston member in the axial direction.

11. The fluid pressure device according to claim 9, wherein the lightening portion comprises a plurality of lightening portions disposed at intervals in a circumferential direction.

12. The fluid pressure device according to claim 8, wherein the first piston member and the second piston member are castings.

13. The fluid pressure device according to claim 1, wherein the fluid pressure device is configured as a fluid pressure cylinder, a valve device, a length-measurement cylinder, a sliding table, or a chuck device.

\* \* \* \* \*